United States Patent
Ledbetter et al.

(10) Patent No.: US 9,550,501 B2
(45) Date of Patent: Jan. 24, 2017

(54) VEHICLE SYSTEM AND METHOD

(71) Applicant: General Electric Company, Schenectady, NY (US)

(72) Inventors: Lamar K. Ledbetter, Lawrence Park, PA (US); Kevin M. Fisher, Erie, PA (US); Jared K. Cooper, Melbourne, FL (US)

(73) Assignee: General Electric Company, Schenectady, NY (US)

( * ) Notice: Subject to any disclaimer, the term of this patent is extended or adjusted under 35 U.S.C. 154(b) by 7 days.

(21) Appl. No.: 14/764,999

(22) PCT Filed: Feb. 19, 2014

(86) PCT No.: PCT/US2014/017159
§ 371 (c)(1),
(2) Date: Jul. 31, 2015

(87) PCT Pub. No.: WO2014/130551
PCT Pub. Date: Aug. 28, 2014

(65) Prior Publication Data
US 2015/0367862 A1  Dec. 24, 2015

Related U.S. Application Data

(60) Provisional application No. 61/766,279, filed on Feb. 19, 2013.

(51) Int. Cl.
*B61C 17/00* (2006.01)
*B61C 5/00* (2006.01)
(Continued)

(52) U.S. Cl.
CPC .......... *B61C 17/00* (2013.01); *B61C 5/00* (2013.01); *B61C 17/02* (2013.01); *B61G 5/08* (2013.01);
(Continued)

(58) Field of Classification Search
None
See application file for complete search history.

(56) References Cited

U.S. PATENT DOCUMENTS

| | | |
|---|---|---|
| 5,777,547 A | 7/1998 | Waldrop |
| 6,408,766 B1 | 6/2002 | McLaughlin et al. |
| 2002/0174796 A1 | 11/2002 | Kumar et al. |

FOREIGN PATENT DOCUMENTS

| | | |
|---|---|---|
| JP | 2000203420 A | 7/2000 |
| JP | 2011024415 A | 2/2011 |

OTHER PUBLICATIONS

International Search Report and Written Opinion dated May 13, 2014 which was issued in connecton wth PCT Patent Application No. PCT/US14/017159 which was filed on Feb. 19, 2014.

*Primary Examiner* — Thomas Tarcza
*Assistant Examiner* — Garrett Evans
(74) *Attorney, Agent, or Firm* — John A. Kramer; Global Patent Operation

(57) ABSTRACT

A vehicle system comprises an interface assembly and a controller both on board a first rail vehicle. The interface assembly comprises one or more mechanical couplers, fuel couplers, fluid couplers, and electrical connectors, to detachably couple the first rail vehicle to a separate, adjacent fuel tender vehicle, for the transfer of one or more of fuel (e.g., compressed natural gas) from the fuel tender vehicle to the first rail vehicle, heated fluid from the first rail vehicle to the fuel tender vehicle (e.g., for regasification of liquid natural gas stored in the fuel tender vehicle to the compressed natural gas), or electrical power and/or control signals between the first rail vehicle and the fuel tender vehicle. The controller is configured to at least partially control operations of the first rail vehicle in relation to interfacing with the fuel tender vehicle for fuel transfer, heated fluid transfer, etc.

20 Claims, 5 Drawing Sheets

(51) Int. Cl.
*B61C 17/02* (2006.01)
*B61G 5/08* (2006.01)
*B61G 5/10* (2006.01)
*B61H 9/00* (2006.01)

(52) U.S. Cl.
CPC ................. *B61G 5/10* (2013.01); *B61H 9/006* (2013.01); *Y02T 30/10* (2013.01)

VEHICLE SYSTEM AND METHOD

TECHNICAL FIELD

Embodiments of the subject matter disclosed herein relate to a vehicle system and method.

DISCUSSION OF RELATED ART

Vehicles may include a prime mover that is powered by a fuel source to generate mechanical energy. In one example, a locomotive engine may generate mechanical energy and use an alternator to convert the mechanical energy to electrical energy. The electricity may power traction motors and other components and systems of the locomotive.

In light of its favorable energy content, natural gas (NG) may be used as a fuel source for a locomotive prime mover. Particularly for long-haul applications, it may also be desirable to utilize a tender car, or fuel tender, for carrying one or more NG storage tanks. Because a natural gas-fueled engine uses a gaseous fuel, if the NG is liquid (LNG) it may be vaporized into compressed natural gas (CNG). Such vaporization may be accomplished by heating the LNG with a heat source.

In some examples, such a heat source may take the form of a heat exchanger. The NG may be transferred from the tender car to a heat exchanger on the locomotive across an interface between the tender car and the locomotive. If the NG is liquid, such an interface requires suitable cryogenic hosing, cryogenic coupling components, and associated design constraints and maintenance requirements. Transferring LNG across such an interface also creates the potential for LNG leaks.

A heat exchanger may be located on-board the tender car. Heated cooling fluid from the locomotive engine may be transferred from the locomotive to the heat exchanger on the tender car across an interface. However, as with transferring LNG across an interface, this configuration requires additional insulated hosing and coupling components that present design challenges and risks. Additionally, LNG storage tanks may generate boil-off gas that may accumulate in the tank. To avoid excess pressure build up, such boil-off gas may be vented from the storage tanks to atmosphere.

The engine may also enter an idle mode when power for the propulsion system is not required. Nevertheless, instead of entering a shutdown mode, the engine may continue to idle to generate electricity needed by components and/or systems on-board the locomotive. Such idling may reduce overall operating efficiencies.

It may be desirable to have a vehicle system and method that differ from those systems and methods that are currently available.

BRIEF DESCRIPTION

In an embodiment, a system (e.g., a vehicle system) comprises an interface assembly and a controller both on board a first locomotive or other first rail vehicle. The interface assembly comprises one or more mechanical couplers configured to mechanically couple the first rail vehicle to a separate, adjacent fuel tender vehicle, and one or more fuel couplers configured to fluidly couple the first rail vehicle to the fuel tender vehicle for the transfer of fuel from the fuel tender vehicle to the first rail vehicle. The interface assembly further comprises one or more electrical connectors configured to electrically connect the first rail vehicle to the fuel tender vehicle for the transfer of at least one of electrical power or one or more first control signals; and/or one or more fluid couplers configured to fluidly couple the first rail vehicle to the fuel tender vehicle for the transfer of a heated fluid between the first rail vehicle and the fuel tender vehicle for regasification of fuel on the fuel tender vehicle. The controller is configured to generate at least one of the first control signals (e.g., for communication to the fuel tender vehicle) or second control signals (e.g., for controlling equipment on board the first rail vehicle) for at least one of controlling the transfer of the fuel from the fuel tender vehicle to the first rail vehicle, controlling the transfer of the heated fluid between the first rail vehicle and the fuel tender vehicle, or controlling coordinated braking of the first rail vehicle and the fuel tender vehicle.

DETAILED DESCRIPTION

Figure 1:
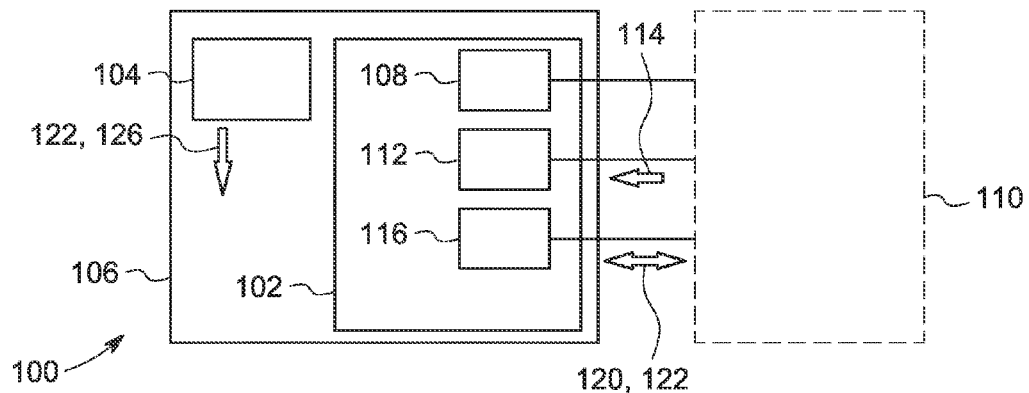
FIG. 1 is a schematic view of a first embodiment of a vehicle system.

The following description relates to various embodiments of a vehicle system and associated methods. While differing configurations of the embodiments exist for different vehicles, one such embodiment relates to a fuel tender and methods related to the fuel tender that stores and delivers fuel to a rail vehicle engine. Another embodiment relates to a controller on board a locomotive (or other rail vehicle having the rail vehicle engine and that is a separate vehicle from the fuel tender) for controlling fuel storage and/or fuel delivery from the fuel tender to the locomotive or other rail vehicle. Another embodiment relates to equipment on board a locomotive (or other rail vehicle having the rail vehicle engine and that is a separate vehicle from the fuel tender) for detachably fluidly coupling, detachably mechanically connecting, and/or detachably electrically connecting the locomotive or other rail vehicle to a fuel tender for the delivery and control of fuel from the fuel tender to the locomotive or other rail vehicle.

In one embodiment, a first rail vehicle may be removably coupled to a second rail vehicle and to a fuel tender. The fuel tender may be removably coupled to a freight car or to the second rail vehicle. The first rail vehicle may include an engine system. In one embodiment, a cylinder may have a gaseous fuel injector and a liquid fuel injector. A suitable liquid fuel may be diesel fuel, ethanol, or gasoline, or combinations thereof (such as a fuel comprising 90% gasoline and 10% ethanol), A suitable gaseous fuel may be natural gas (NG) or methane. Liquid and gaseous states may be used herein to refer to the state, generally, of the fuel just prior to its use. Diesel is considered a liquid, even though it is atomized and injected in a fine mist or spray under pressure during combustion. By way of contrast, NG is considered a gas, even though it may be compressed and chilled so as to be stored in a liquid state. Prior to NG being used, the LNG is warmed and expanded to its gaseous form. By changing various hardware features and control systems, other liquid and/or gaseous fuels may be used.

As discussed in more detail with reference to the figures below, the rail vehicle to fuel tender interface includes a plurality of couplings. Such couplings may include fluid couplings, fuel couplings, mechanical couplings, electrical connectors, and the like.

An on-board controller may control the primary engine by sending commands to various engine control hardware components such as invertors, alternators, relays, fuel injectors, fuel pumps, etc. The controller may monitor rail vehicle operating parameters in active operation, idle, and shutdown states. Such parameters may include manitbld air temperature (MAT), ambient temperature, engine oil temperature, compressor air pressure, main air reserve pressure, battery voltage, a battery state of charge, brake cylinder pressure, etc. The controller may include non-transient computer readable storage media including code for enabling on-board monitoring and control of rail vehicle operation.

The controller, while overseeing control and management of the primary engine and other rail vehicle components, may receive signals from a variety of engine sensors. The controller may utilize such signals to determine operating parameters and operating conditions, and correspondingly adjust various engine actuators to control operation of the rail vehicle. For example, the controller may receive signals from various engine sensors including, but not limited to, engine speed, engine load, boost pressure, exhaust pressure, ambient pressure, exhaust temperature, etc. Correspondingly, the controller may control the rail vehicle by sending commands to various components such as traction motors, alternators, cylinder valves, throttles, etc.

In one example, the on-board controller may execute code (stored on the non-transient computer readable storage media) to auto-stop or auto-start the primary engine by enabling, for example, an Automatic Engine Start/Stop (AESS) control system routine. As discussed in more detail below, the controller may also communicate with another controller on-board the fuel tender to, for example, request delivery of gaseous natural gas for the primary engine. The controller may also communicate with a controller on-board the second rail vehicle, for example, to coordinate pass-through delivery of gaseous natural gas from the fuel tender to a natural-gas fueled engine in the second rail vehicle. The computer readable storage media may include code, that when executed by the on-board controller, causes the controller to control appropriately transmitting and receiving such communications.

The fuel tender may be removably coupled to the rail vehicle and includes axles/wheels configured to travel along a railroad track. The fuel tender includes a coupling mechanism that may removably couple the fuel tender to the rail vehicle. In other examples, the fuel tender may include a second coupling mechanism that may removably couple the fuel tender to another rail vehicle, such as the freight car, The fuel tender may carry one or more fuel storage tanks. In one embodiment, the fuel tender includes an on-board cryogenic LNG storage tank for storing LNG. In one example, the LNG storage tank may take the form of a vacuum-jacketed pressure vessel that stores LNG at pressures ranging from approximately 50 kPa to approximately 1,700 kPa. To maintain LNG in a liquid state for an extended period, the LNG may be stored at a temperature of approximately negative 260 degrees Celsius or lower. In some examples, the fuel tender may also include a cryogenic unit for helping maintain the LNG within desired temperature and pressure ranges, Even with efficient insulation and cryogenic refrigeration equipment, heat may leak into the LNG storage tank and vaporize a portion of the LNG. Such resulting boil-off gas may be used to power an APU engine located on-board the fuel tender (an "on-board" engine). For purposes of this description, an "on-board" component, device, or other structure means that the component or device may be physically located on the vehicle being described. For example, with respect to the fuel tender, a component or structure physically located on the fuel tender may be "on-board" the fuel tender, including when the fuel tender may be coupled to a locomotive or other rail vehicle and when the fuel tender may be not coupled to a locomotive or other rail vehicle.

Portions of such boil-off gas accumulating in the LNG storage tank may be delivered to and stored in an on-board reservoir that may supply gaseous natural gas to the on-board engine. The storage tank may have various sizes and configurations, may be removable from the fuel tender, and may be configured to receive LNG from an external refueling station via a port.

The LNG storage tank may supply LNG via a cryogenic LNG fluidic coupling and one or more valves to a regasification unit or heat exchanger. The regasification unit may convert the LNG into a compressed and gaseous natural gas foam (CNG). The CNG then may be delivered to the primary engine of the first rail vehicle to power the primary engine. The CNG may be delivered to the primary engine via fluidic coupling and one or more control valves. In some examples, a pass-through control valve may be provided to direct at least a portion of the CNG through the first rail vehicle via a pass through fluidic coupling to the second rail vehicle. In this manner, a natural gas-fueled engine in the second rail vehicle may be powered by gaseous natural gas from the fuel tender. The gaseous natural gas fluidic coupling includes a detachable interface coupling that enables the fuel tender to be decoupled from the rail vehicle. In other embodiments the pass-through control valve may be located on-board the fuel tender, along with suitable fluidic couplings to pass through fluidic coupling.

By converting the LNG to gaseous natural gas on-board the fuel tender and supplying gaseous natural gas to the primary engine, standard gaseous natural gas conduit and interface couplings may be utilized between the fuel tender and the rail vehicle. Such a configuration may reduce costly cryogenic tubing and interface couplings, and the corresponding design challenges, that would otherwise be required for transferring LNG between the fuel tender and the rail vehicle. Additionally, using such standard, low pressure gaseous natural gas fluidic and interface couplings eliminates the possibility of LNG leaks between the fuel tender and rail vehicle.

Additionally, the on-board engine may serve as a heat source that provides heated fluid to the regasification unit. Examples of suitable fluids that may be used include, but may be not limited to, engine oil, water, glycols, salt solutions, alcohols, intake air, exhaust gas, and mixtures of two or more of the foregoing. In one example, the on-board engine may comprise a natural gas-fueled combustion engine that includes a heat exchanger, such as a radiator, that generates heated liquid. The onboard engine may he fluidically coupled to the regasification unit via fluidic coupling and may supply the heated liquid to the regasification unit via the fluidic coupling. The regasification unit may then utilize the heated liquid to heat the LNG and convert the LNG to gaseous natural gas.

In one embodiment, the fluid interface may transmit a 60% polypropylene glycol/40% water mixture to the fuel tender. The rail vehicle may signal the fuel tender that the rail vehicle wants to begin pumping hot fluid to the fuel tender's regasification unit. The rail vehicle may wait for a response back from the fuel tender that it is ready to receive the fluid prior to commencing pumping.

In one embodiment, the rail vehicle may provide two different levels of coolant flow depending upon the gas flow demand of the engine. The low setting may be 20 gallons per minute (gpm) and the high setting may be 50 gallons per minute (gpm), for example. Alternatively, an infinitely variable flow level might be used. Once gas demand exceeds a determined pounds-mass per minute (lbm/min) rate, the control system may close the glycol bypass control valve to increase the flow to the higher setting.

The pressure drop through the tender car (including piping, vaporizer, and any other components) may be about 15 pounds per square inch (psi) at about 50 gallons per minute (gpm) flow rate. A suitable fluid temperature (e.g., of the heated fluid) may be in a range of from about 105 degrees F. to about 120 degrees F. The natural gas temperature may be about equal the temperature of the hot fluid.

During transient high ambient temperature operation, e.g., a tunnel, the controller may open a secondary coolant loop that could cool the manifold air temperature (MAT). This may extend the period of operation before derating the engine. Also, fuel savings may be achieved for use in high ambient temperature environments by operating the secondary loop to cool the MAT.

In other non-limiting embodiments, the heated fluid generated by the on-board engine may comprise air and/or exhaust gas resulting from combustion within the on-board engine. In one example, the on-board engine may supply heated exhaust gas to the regasification unit via fluidic coupling. The regasification unit may then utilize the heated exhaust gas to heat the LNG and convert the LNG to gaseous natural gas. In another example, the on-board engine may receive ambient air that may be heated and supplied to the regasification unit via fluidic coupling. The regasification unit may then utilize the heated air to heat the LNG and convert the LNG to gaseous natural gas.

In other examples the on-board engine may generate both heated liquid and heated gas, and may supply both heated liquid and heated gas to the regasification unit. In other examples the on-board engine may utilize one or more fuels such as, for example, diesel, gasoline, biogas, propane, and the like. The fuels are dictated at least in part by the engine and the fuel systems. Sonic fuels may be more easily substitutable with the only changes being in the engine control unit to account for fuel differences (viscosity, energy density, flammability, and the like).

By utilizing the on-board engine as a heat source to provide heated fluid to the regasification unit, and by converting the LNG to gaseous natural gas on-board the fuel tender, the fuel tender may be liquidly isolated from the rail vehicle. For purposes of this description, "liquidly isolated" means that neither LNG nor heated fluid may be transferred from the fuel tender to the rail vehicle, or vice versa. Advantageously, such configurations avoid the possibility of LNG and/or heated fluid leaks and other malfunctions that could occur in the transfer of LNG and/or heated fluid between the fuel tender and the rail vehicle.

The on-board engine may comprise a natural-gas fueled engine that may be powered by boil-off gas supplied from the LNG storage tank. The on-board engine may receive boil-off gas from the storage tank via boil-off gas fluidic coupling and one or more control valves. The boil-off gas from the storage tank may be used to power the on-board engine, and thereby avoid venting such gas to atmosphere. The described configuration makes productive use of such boil-off gas.

A reservoir may be a dead space in the main fuel tank, or may be a separate chamber, and is on-board the fuel tender. It may receive boil-off gas from the storage tank via boil-off gas fluidic coupling and control valve. The reservoir may be fluidically coupled to the on-board engine via fluidic coupling. The reservoir may provide a ready source of gaseous natural gas for starting the on-board engine and for operating the on-board engine.

The reservoir may also receive gaseous natural gas produced by the regasification unit via gaseous natural gas fluidic coupling and one or more control valves. In this manner, the regasification unit may supply gaseous natural gas to the reservoir, for example, to maintain the reservoir at a desired storage level.

The gaseous natural gas may be supplied directly from the regasification unit to the on-board engine via a gaseous natural gas fluidic coupling, control valve, and fluidic coupling. This configuration enables the on-board engine to operate using gaseous natural gas from the regasification unit independently from, or in combination with, gaseous natural gas from the reservoir. In one example where gaseous natural gas may be supplied directly from the regasification unit to the on-board engine, a reservoir may not be utilized. In such a configuration, boil-off gas may also he routed directly to the on-board engine, and a separate starting mechanism may be utilized to start the on-board engine.

The on-board engine may be further configured to generate electricity that may be delivered to one or more components on-board the fuel tender and/or on-board the rail vehicle. A power conversion unit includes an alternator that may be connected in series to one or more rectifiers that convert the alternator's AC electrical output to DC electrical power prior to transmission along the electrical bus. Based on the configuration of a downstream electrical component receiving power from the electrical bus, one or more inverters may be configured to invert the electrical power from the electrical bus prior to supplying electrical power to the downstream component. In one example, a single inverter may supply AC electrical power from a DC electrical bus to a plurality of components. In one embodiment, each of a plurality of distinct inverters may supply electrical power to a distinct component.

In some situations, the rail vehicle may be shifted to a shut-down mode after a specified period of engine operation and/or based on one or more engine operating conditions. In one example, an AESS routine may include monitoring of a plurality of rail vehicle operating parameters to verify that they may be at a desired condition. If the AESS criteria may he met and the primary engine may be running, the engine may then he automatically shut-down. In this manner, by reducing the idling time of the primary engine, fuel economy and reduced emission benefits may be achieved.

During shut-down conditions, it may be desirable to continue operating electronics on-board the rail vehicle, such as an on-board rail vehicle monitoring system, electronics control system including controller, and/or other rail vehicle components. For example, during rail vehicle shut-down conditions a plurality of engine operating parameters may be monitored, and the engine may be automatically started in response to any of the plurality of monitored rail vehicle operating conditions falling outside a respective desired condition. Accordingly, in one non-limiting embodiment the power conversion unit of the fuel tender may provide electrical power via electrical bus to the first rail vehicle. Such electrical power may be used, for example, to power an on-board rail vehicle monitoring system, operate the electronics control system including controller, charge batteries, and/or power other components on-board the first rail vehicle. Advantageously, by utilizing power provided by the fuel tender, the first rail vehicle may be maintained in a shut-down condition while continuing to operate electronic components on-board the first rail vehicle. Accordingly, the amount of idling time of the primary engine may be reduced and the rail vehicle system efficiency may be correspondingly increased.

A controller on-board the fuel tender may control various components on-board the fuel tender, such as the regasification unit, on-board engine, power conversion unit, cryogenic unit, control valves, and/or other components on-board the fuel tender, by sending commands to such components. The on-board controller may also monitor fuel tender operating parameters in active operation, idle, and shutdown states. Such parameters may include, but may be not limited to, pressure and temperature of the LNG storage tank, pressure and temperature of the regasification unit, on-board engine temperature, pressure, and load, compressor pressure, heating fluid temperature and pressure, ambient air temperature, and the like. In one example, the controller may execute code to auto-stop, auto-start, operate, and/or tune the on-board engine and regasification unit in response to one or more control system routines. The controller may transmit to and receive communications from another controller on-board the first rail vehicle and/or yet another controller on-board the second rail vehicle.

The controller may change an air flow using one or more pneumatic control valves for the heat exchange loop in the regasification unit. The valves respond to the controller signal to open and close the LNG pathway, and therefore the supply of LNG to the loop. Other alternatives may include solenoids and the like that are electrically driven. However, the air-operated pneumatic valves provide relatively greater power. The pressurized air flow may be supplied from the main reservoir equalizing pipe (MRE). Because the MRE supplies the brake lines, and if the brake line pressure is not proper the vehicle is prevented from moving, precautions may be added when the MRE is tapped. Suitable precautions may include one or more choke valve. Rather than the MRE, a dedicated line may be used or a dedicated compressor, which, relative to the MRE version would reduce the need for a regulator valve, check valve, and the like. Where an electric solenoid may be used, precautions may include management of thermal issues for both over and under a desired operating temperature range. The system may further include air quality conditioning means, such as an air drier, heater, spitter, condensing piper, water trap, and/or drain. Fluidic coupling can allow the heat exchanger to keep valves unfrozen.

The vehicles may communicate with each other through one or more communications protocols. Such communication may facilitate diagnostics, prognostics, basic controls, tender pressure levels with regard to pressure changes, fuel levels, and the like. An Ethernet over multiple unit (eMU) system may allow for broad based information transfer. In one embodiment, the eMU further transfers safety critical information, such as information relating to fuel leaks, fire, or other malfunction. In one embodiment, regardless of the presence or absence of an eMU unit, distinct direct wire communication may be used, particularly for safety critical information transfer. In another embodiment, wireless communication may be used and/or a CAN bus configuration may be used. Combinations of the foregoing may be used, despite the associated cost disadvantage, to provide redundancy of communication.

Another aspect of the communication relates to communication integrity. Encryption may be used to provide security and integrity of the communication. In one embodiment, the communication may be self-encrypting. For example, a plurality of processors each may add encryption portions to a message string on the transmitting side, which can be decrypted only by corresponding ones of a plurality of processors on the receiving side. A CRC polynomial may be used, and there may be multiple packet inclusions. A vehicle safe state may be defined in which the fuel tender does not supply fuel (e.g., NG) forward to the rail vehicle. In case of communication loss, the system moves to the safe state. Additional aspects of the safe state may include maintaining temperature and pressure in the fuel tender in a determined range of temperatures and pressures.

With regard to determining a fuel level in the fuel tender, one method may include estimating the fuel level in a stationary tender car. The estimation may be sent, via eMU for example, to the engine control unit (ECU) that calculates use based on engine operation, distance, and/or other parameters. An onboard pump can be used to control pressure in the dead space in the fuel tender. Alternatively or additionally, a heater can heat the fuel tender tank to provide a desired pressure level. The pump and/or heater may be used to create a saturated liquid NG and/or pump to pressure in the dead space. Suitable pumps may include a cryogenic pump rated to about negative 260 degrees Celsius and 10 pounds per square inch (psi) up to a near boiling temperature for LNG of about negative 200 degrees Celsius and about 120 psi. In an embodiment that, for example, uses a direct injection fuel system the pressure may be about 5000 psi, and there may be no LNG and/or a large amount of pressurized space filled with CNG.

In one embodiment, an ISO tank is replaceably mounted on a platform car. The ISO tank may be loadable with a crane or similar conveyance so that fueling is an exercise in swapping a full tank for an empty one. Pumps, conditioning systems, cryogenics, and fuel measurement devices (such as scales) may be kept on the wayside and/or on a filler vehicle. The filler vehicle can swap ISO containers or alternatively/additionally fill non-swapable fuel tender containers. As between the cars, the ISO container may include break away fittings with check valves. In one embodiment, a ½" 5000 psi hose may be used, particularly for direct injection fuel systems. For micropilot and/or port injection systems a 2" and 120 psi hose may be used. For fleet flexibility, in one embodiment the fuel tender includes high and low pressure capabilities. Such capabilities may be enabled using both the smaller, higher pressure hose and a larger, lower pressure hose. The corresponding pressure regulators are configured to know which system (high or low pressure) is being used so that the regasification unit knows how to convert the LNG to CNG and at what pressure. Further, the pump may be configured to handle either the high or low pressure system. For example, an inverter may be used to drive the pump speed faster or slower depending on the desired pressure state.

In one embodiment, the controller is configured to run a startup fuel conditioning routine. The routine may engage a fuel conditioning system on the fuel tender. In another embodiment, the NG fuel is already conditioned upon receipt, such as what "LNG in a box" may provide.

To provide power to the fuel tender, and to pumps on the fuel tender, an alternator may be used to provide electricity at a particular waveform, e.g., 480 volt three-phase electricity. This may entail another a dedicated winding, and an inverter may be used to account for frequency changes that occur with engine speed changes. In another embodiment, 74 volt power may be provided, particularly through the MU cabling.

The controller may have a shutdown procedure. During the shutdown mode, the controller may change the amount of NG used by the engine relative to the amount of diesel. That is, it may phase in and out the NG substitution level. The controller also may control flowing higher pressure vapor out of vaporizer and back to tank dead space. This may reduce the need to vent CNG to atmosphere as a result of pressure build up.

In one embodiment, rather than an APU on board the tender or on the rail car, and rather than an alternator with an additional winding, a fuel cell system may be mounted on the fuel tender and/or the rail vehicle. The fuel cell may then use NG as a fuel source to generate electricity to power the fuel tender systems.

For configurations where there is a rail vehicle—fuel tender—fuel tender—rail vehicle, the system may control the LNG quantities of the fuel tenders. In one embodiment, LNG may be pumped between fuel tenders to maintain an about equal amount of LNG in each. In a different operating mode, the LNG may be used preferentially in one fuel tender. Should one fuel tender have more dead space the controller may use that dead space for fuel conditioning, for CNG return in the case of pressure build up in the regasification unit, and the like.

In any of the embodiments herein, heated fluid refers to a fluid in a system where the fluid is in a state of elevated temperature relative to a previous temperature of the fluid in the system. For example, engine cooling fluid may be at a first temperature when in a coolant storage tank, and then heated to a higher, second temperature (and thereby the cooling fluid becomes a heated fluid) due to cooling an engine. In one embodiment, a heated fluid is in a range of from about 105 degrees F. to about 120 degrees F. (approximately 40 degrees C. to 50 degrees C.).

Figure 2:
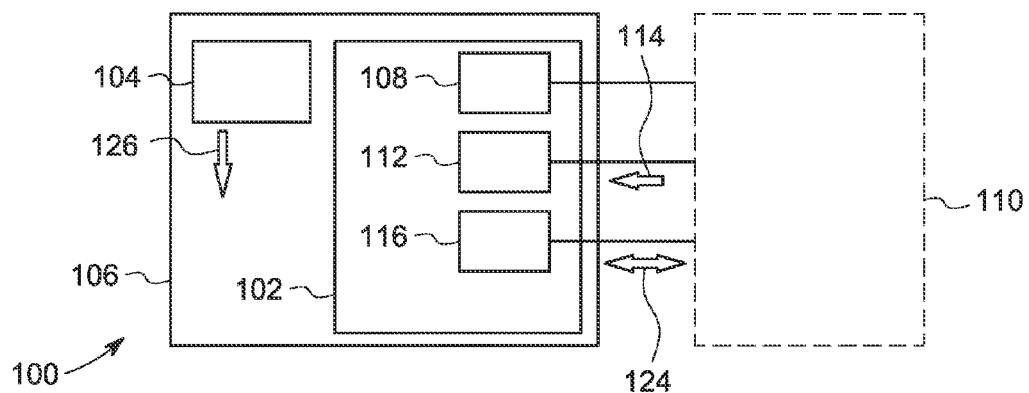
FIG. 2 is a schematic view of another embodiment of a vehicle system.
Figure 3:
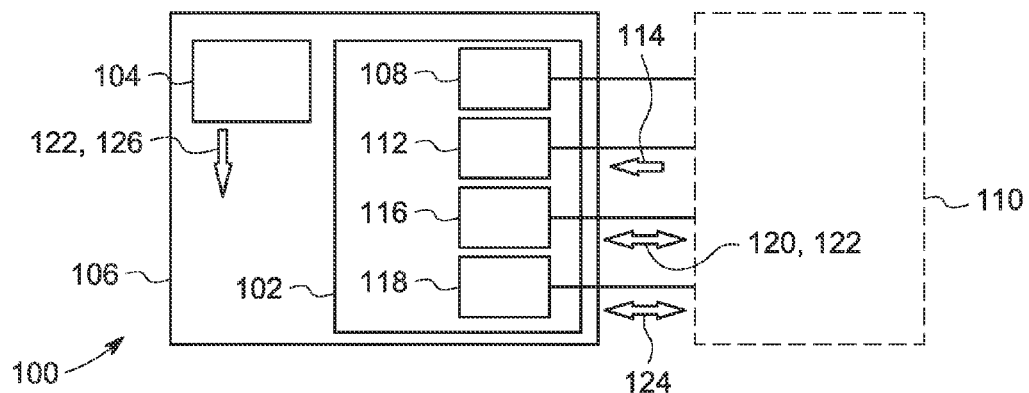
FIG. 3 is a schematic view of another embodiment of a vehicle system.

In an embodiment, with reference to FIG. 1, a system (e.g., a vehicle system) 100 comprises an interface assembly 102 and a controller 104 both on board a first locomotive or other first rail vehicle 106. The interface assembly 102 comprises one or more mechanical couplers 108 configured to mechanically couple the first rail vehicle 106 to a separate, adjacent fuel tender vehicle 110, and one or more fuel couplers 112 configured to fluidly couple the first rail vehicle to the fuel tender vehicle for the transfer of fuel 114 from the fuel tender vehicle 110 to the first rail vehicle 106. The interface assembly 102 further comprises one or more electrical connectors 116 and/or one or more fluid couplers 118. For example, in FIG. 1, the interface assembly 102 further comprises the one or more electrical connectors 116 but not the fluid coupler(s). In an embodiment as shown in FIG. 2, the interface assembly 102 further comprises the one or more fluid couplers 118 but not the electrical connector(s). In an embodiment as shown in FIG. 3, the interface assembly 102 further comprises both the one or more electrical connectors 116 and the one or more fluid couplers 118. Further description herein will be with respect to embodiments similar to that of FIG. 3 (having both electrical connectors and fluid connectors), but as will be appreciated, not all embodiments may include both.

In embodiments, the one or more electrical connectors 116 are configured to electrically connect the first rail vehicle 106 to the fuel tender vehicle 110 for the transfer of electrical power 120 and/or one or more first control signals 122. The one or more fluid couplers 118 are configured to fluidly couple the first rail vehicle 106 to the fuel tender vehicle 110 for the transfer of a heated fluid 124 (e.g., a 60% polypropylene glycol/40% water mixture or otherwise) between the first rail vehicle and the fuel tender vehicle for regasification of fuel on the fuel tender vehicle.

In embodiments of the interface assembly 102, at least some of the couplers and/or connectors comprise respective mechanical assemblies, receptacles, ports, attachment points, related mechanical supports/fasteners/housings, etc., as applicable, which may be female or male or otherwise, for detachably connecting various hoses, conduits, electrical cables, other couplers/connectors, or the like to the first rail vehicle 106. (For operably coupling the first rail vehicle 106 to the fuel tender vehicle 110, the hoses, conduits, electrical cables, other couplers/connectors, etc. are in turn detachably connected to the fuel tender vehicle 110.) For example, one of the mechanical couplers 108 may comprise a standard railway coupler/coupling (a railway coupling is a mechanism for connecting rolling stock in a train), which is configured to mechanically engage a corresponding and complementary shaped railway coupling on the fuel tender vehicle. An example of a suitable standard railway coupler for the first railway vehicle is a Type F coupler. As another example, one of the electrical connectors 116 may comprise a port for receiving a standard or other MU cable. As another example, the fuel coupler 112 may comprise a hose or conduit receptacle for receiving a fuel hose or conduit and a fastener assembly, attached to or by the receptacle, for detachably but securely holding the fuel hose or conduit in place when in the receptacle.

The controller 104 is configured to generate at least one of the first control signals 122 (e.g., for communication to the fuel tender vehicle) or second control signals 126 (e.g., for controlling equipment on board the first rail vehicle) for controlling the transfer of the fuel from the fuel tender vehicle to the first rail vehicle, controlling the transfer of the heated fluid between the first rail vehicle and the fuel tender vehicle, and/or controlling coordinated braking of the first rail vehicle and the fuel tender vehicle. For example, if the system includes transfer of both fuel from the fuel tender vehicle to the first rail vehicle and heated fluid between the first rail vehicle and the fuel tender vehicle, then the controller may he configured to generate the first control signals and/or the second control signals to both control the transfer of the fuel from the fuel tender vehicle to the first rail vehicle and control the transfer of the heated fluid between the first rail vehicle and the fuel tender vehicle.

As discussed above, the fuel tender vehicle may store liquid natural gas, which is converted to compressed natural gas (on board the fuel tender vehicle or on board the first rail vehicle) for use as fuel for the first rail vehicle. In an embodiment, with reference to FIG. 4, the controller 104 is configured to generate the first control signals 122 and/or the second control signals 126 for controlling the transfer of the heated fluid 124 from the first rail vehicle to the fuel tender vehicle for the regasification of liquid natural gas 128 to compressed natural gas 130. The one or more fuel couplers 112 are configured for the transfer of the compressed natural gas 130 from the fuel tender vehicle to the first rail vehicle as the fuel 114.

Figure 4:
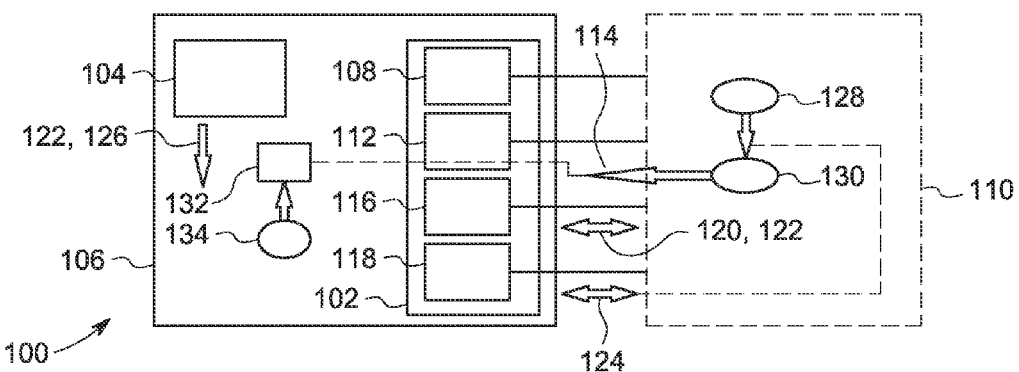
FIG. 4 is a schematic view of another embodiment of a vehicle system.

In another embodiment, still with reference to FIG. 4, the system further comprises a primary engine 132 on board the first rail vehicle. (In this context, primary refers to the engine being configured for generating motive power to move the first rail vehicle and the fuel tender vehicle when the fuel tender vehicle is mechanically coupled to the first rail vehicle by way of one or more of the one or more mechanical couplers.) The primary engine is configured to operate, in at least one mode of operation, using a first fuel 134 (e.g., diesel or gasoline) as an at least partial energy source, and to operate, in at least one other mode of operation, using the compressed natural gas 130 as an at least partial energy source.

Figure 5:
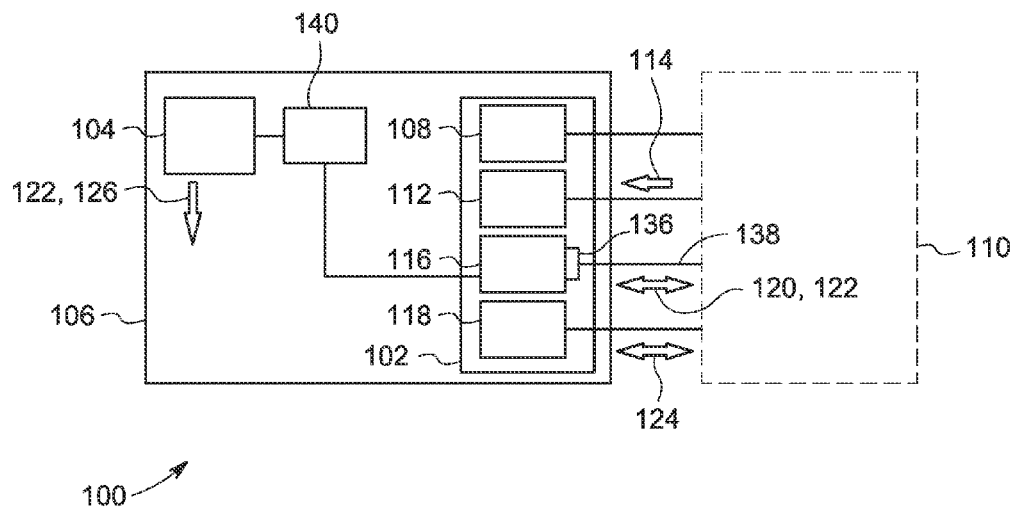
FIG. 5 is a schematic view of another embodiment of a vehicle system.

In another embodiment, with reference to FIG. 5, at least one of the one or more electrical connectors 116 is a locomotive multiple unit (MU) connector 136 for electrically connecting an MU cable 138 between the first rail vehicle and the fuel tender vehicle. The system may further comprise a router transceiver unit 140 on board the first rail vehicle configured to communicate high bandwidth network data over the MU cable between the first rail vehicle and the fuel tender vehicle. The controller 104 is connected to the router transceiver unit for communicating one or more of the at least one of the first control signals or the second control signals as the network data over the MU cable between the first rail vehicle and the fuel tender vehicle. More information about router transceiver units and high bandwidth network communications over MU cables/cable buses is found in U.S. Pat. No. 8,532,850, issued 10 Sep. 2013, and in U.S. Pat. No. 8,583,299, issued 12 Nov. 2013, and in U.S. Pat. No. 8,645,010, issued 4 Feb. 2014, all of which are incorporated herein by reference in their entireties.

Figure 6:
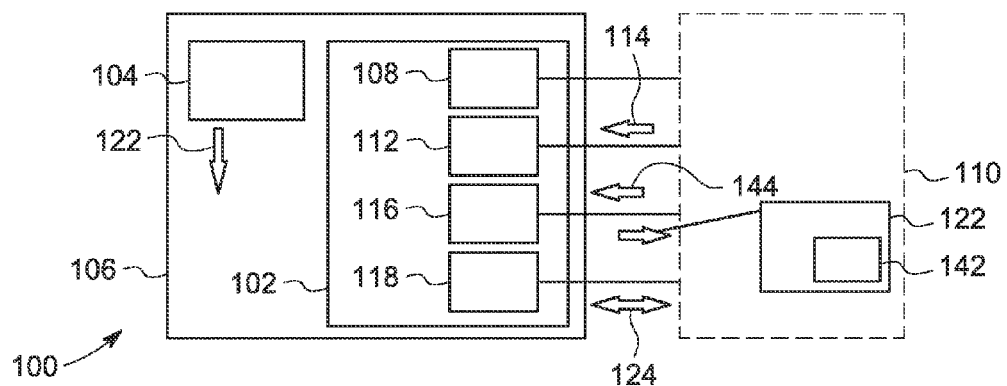
FIG. 6 is a schematic view of another embodiment of a vehicle system.

In another embodiment, with reference to FIG. 6, the controller 104 is configured to generate the one or more first control signals 122 for controlling the transfer of the heated fluid 124 from the first rail vehicle 106 to the fuel tender vehicle 110. (The controller may additionally generate the second control signal(s) 126.) The one or more first control signals 122 comprise an initiation signal 142 indicating that the first rail vehicle is ready to provide the heated fluid to the fuel tender vehicle. The controller 104 is configured to initiate providing of the heated fluid 124 to the fuel tender vehicle responsive to receiving an acknowledgement signal 144 from the fuel tender vehicle, in response to the initiation signal, indicating that the fuel tender vehicle is ready to receive the heated fluid.

Figure 7:
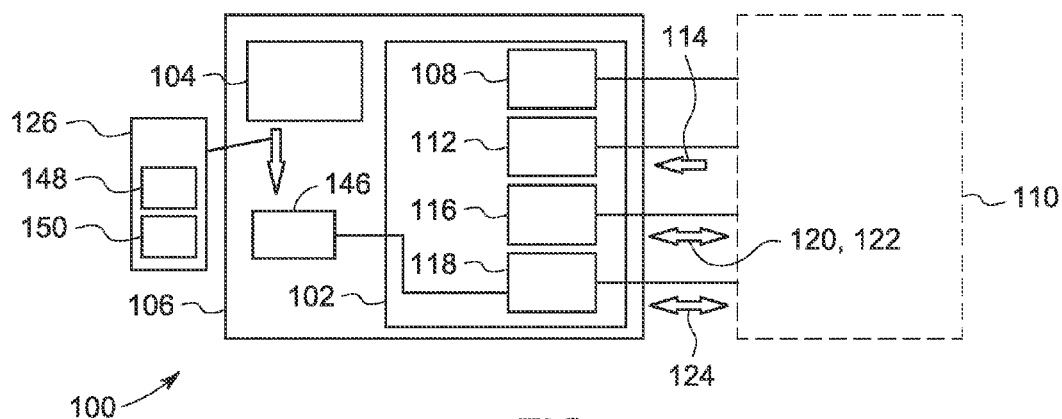
FIG. 7 is a schematic view of another embodiment of a vehicle system.

In another embodiment, with reference to FIG. 7, the controller 104 is configured to generate the one or more second control signals 126 for controlling a pump 146 on board the first rail vehicle to pump the heated fluid 124 from the first rail vehicle to the fuel tender vehicle over the one or more fluid couplers 118. The one or more second control signals 126 may comprise at least a first pump signal 148 for controlling the pump to provide a first level of flow of the heated fluid and a second pump signal 150 for controlling the pump to provide a higher, second level of flow of the heated fluid. (The controller may be configured to generate the first pump signal based on or responsive to a first operating condition or conditions of the first rail vehicle and/or fuel tender vehicle, and to generate the second pump signal based on or responsive to a different, second operating condition or conditions of the first rail vehicle and/or fuel tender vehicle, or based on or responsive to other designated criteria as discussed herein.)

Figure 8:
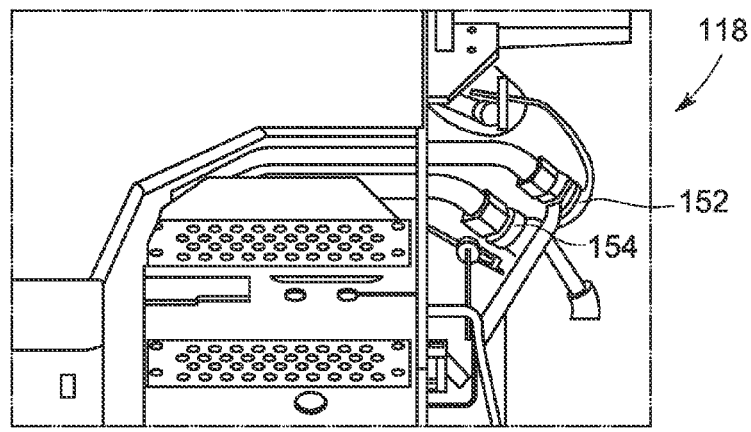
FIG. 8 is a perspective view of fluid couplings of a rail vehicle, according to an embodiment.

In another embodiment, with reference to FIG. 8, the one or more fluid couplers 118 comprise a first fluid coupler 152 for transfer of the heated fluid 124 from the first rail vehicle to the fuel tender vehicle and a second fluid coupler 154 for the first rail vehicle to receive the heated fluid back from the fuel tender vehicle. For example, the heated fluid 124 may be heated in the first rail vehicle, pumped to the first fluid coupler 152 where it travels through the first fluid coupler 152 and then through a first flexible pipe, hose, or other conduit (not shown) interconnecting the first fluid coupler 152 to the fuel tender vehicle, passed to a regasification unit on the fuel tender vehicle, passed through a second flexible pipe, hose, or other conduit (not shown) interconnecting the fuel tender vehicle with the second fluid coupler 154, and passed from the second fluid coupler 154 to a storage tank on board the first rail vehicle. (The heated fluid will typically lose energy, and thereby drop in temperature, by the time it returns to the first rail vehicle from the fuel tender vehicle.)

Figure 9:
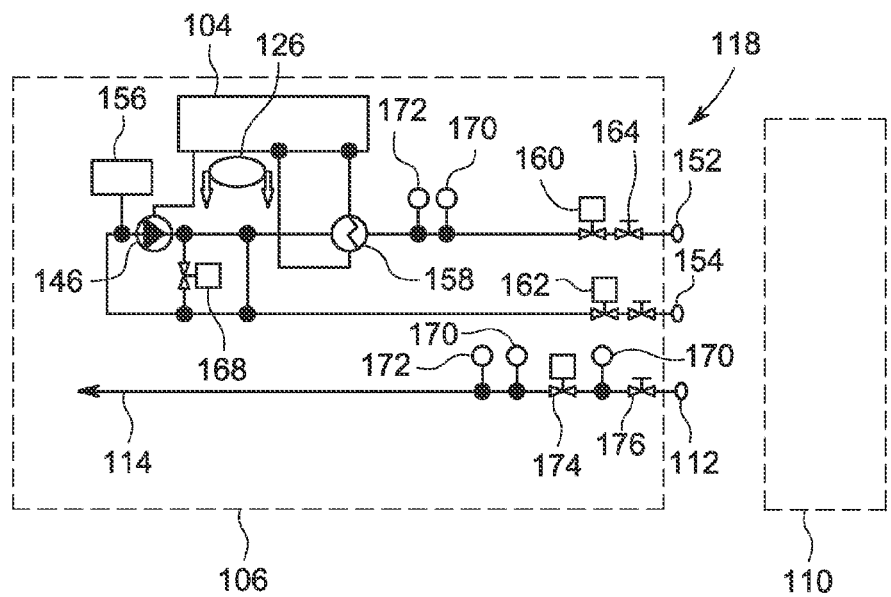
FIG. 9 is a schematic view of another embodiment of a vehicle system.

In another embodiment, with reference to FIG. 9, the system further comprises a pump 146 on board the first rail vehicle 106 and in fluid communication with the one or more fluid couplers 118. The system further comprises a tank 156 on board the first rail vehicle and in fluid communication with the pump. The tank 156 is configured to store a fluid. The tank may have a capacity, for example, of 20 to 30 gallons (approximately 75 to 115 liters). The system further comprises a heating device 158 on board the first rail vehicle and in fluid communication with at least one of the pump, the tank, or the one or more fluid couplers. The heating device 158 is configured to heat the fluid to the heated fluid. The controller 104 is configured to generate the second control signals for controlling the pump and/or the heating device and/or other control devices.

Figure 10:
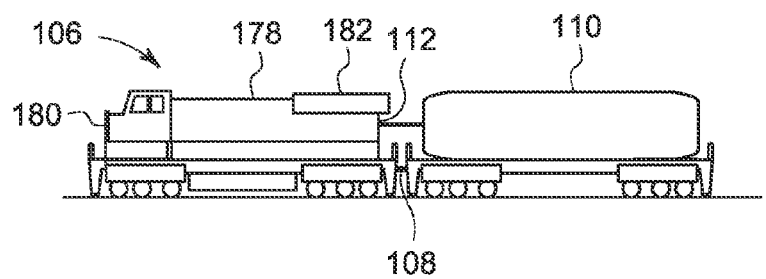
FIG. 10 is a side elevation schematic view of a locomotive and fuel tender vehicle, according to an embodiment.

In other embodiments, still with reference to FIG. 9, the system may additionally or alternatively comprise one or more of: first and second control valves 160, 162 (e.g., air-actuated ball valves) on board the first rail vehicle for controlling the provision and return, respectively, of the heated fluid to the fluid couplers 152, 154 (and thereby to the fuel tender vehicle); first and second manual shut off valves 164, 166 connected to the first and second fluid couplers 152, 154, respectively, for manually closing the lines to the first and second fluid couplers; a heated fluid bypass control 168; pressure sensors 170, e.g., a first, pump discharge pressure sensor for sensing the pressure of heated fluid exiting the pump 146, a second pressure sensor for measuring a pressure of fuel at the fuel coupler 112 (i.e., fuel pressure of fuel from the fuel tender vehicle), and/or a third pressure sensor for measuring a pressure of fuel in the main fuel line of the first rail vehicle downstream from the fuel coupler 112); temperature sensors 172 (e.g., a first temperature sensor for measuring a temperature of the heated fluid exiting the heating device 158, and/or a second temperature sensor for measuring a temperature of the fuel provided from the fuel tender vehicle); a fuel supply control valve 174 (e.g., an air-actuated ball valve); and/or a fuel supply manual shut off valve 176, In another embodiment, with reference to FIG. 10, the first rail vehicle 106 is a locomotive 178 having a short hood 180 on a first end of the locomotive and a long hood 182 on a distal, second end of the locomotive. The one or more fuel couplers 112 are located at the second end (long hood end) of the locomotive. The short hood end may be an end of the locomotive where the operator cab is located, or an end of the locomotive that is closest to the operator cag. The one of more fuel couplers may comprise one fuel coupler only, that is, the locomotive has the one fuel coupler only and no other fuel couplers for transfer of fuel from the fuel tender vehicle to the locomotive. (Having only one fuel coupler may simplify the system, result in lower implementation costs, and improve system performance from the standpoint of potential fuel leaks.)

In another embodiment, the interface assembly 102 comprises the one or more electrical connectors 116 configured to electrically connect the first rail vehicle to the fuel tender vehicle. One or more of the electrical connectors is for the transfer of electrical power 120 from the first rail vehicle to the fuel tender vehicle. The first rail vehicle is configured to output the electrical power, at the electrical connector(s) provided for that purpose, at a nominal 74V DC (meaning a recommended or designated operating voltage within a designated range of operation, e.g., 74V DC within a range of 45V DC to 87V DC). The first rail vehicle and/or the fuel tender vehicle may be configured to limit current draw of the fuel tender vehicle from the first rail vehicle to no more than 50 amperes, e.g., 3.7 KWe.

Figure 11:
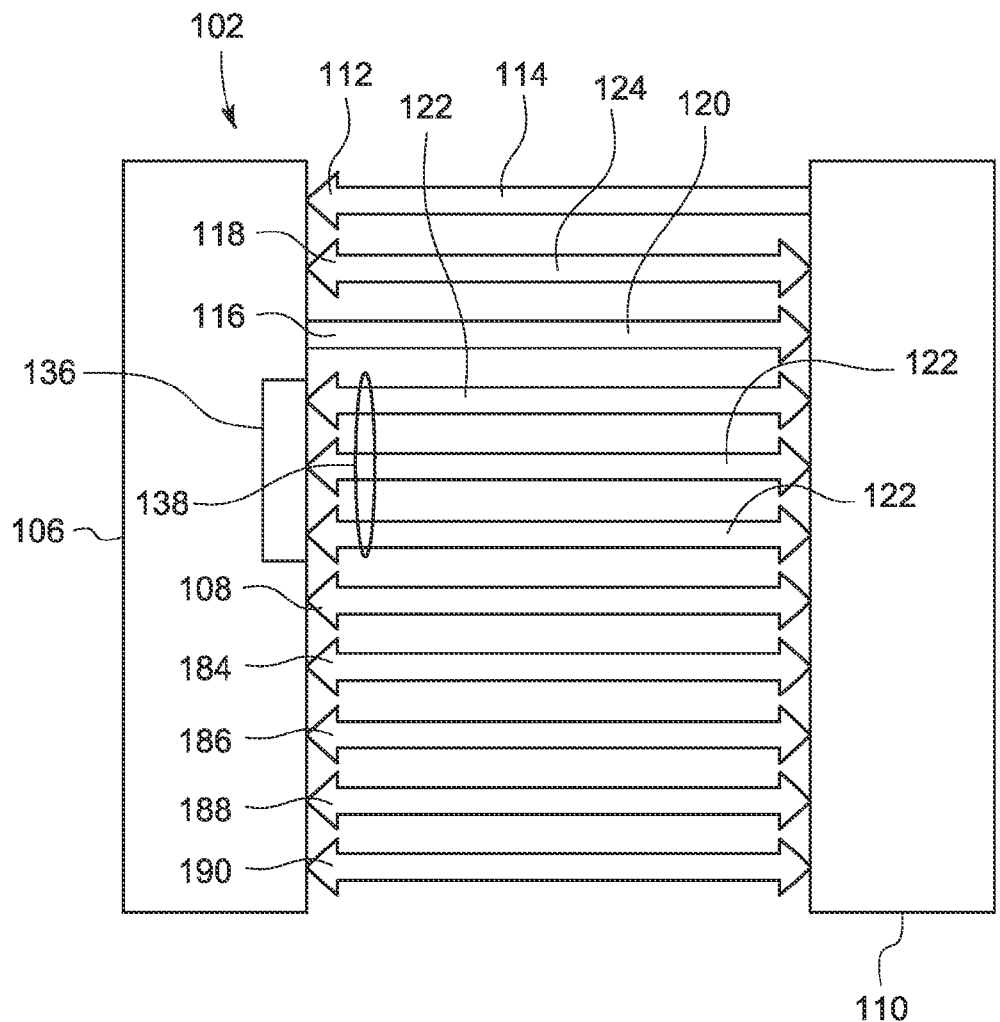
FIG. 11 is a schematic view of another embodiment of a vehicle system.

FIG. 11 shows another embodiment of the interface assembly 102. Here, the interface assembly comprises a fuel coupler 112, fluid couplers 118 (e.g., one fluid coupler for attaching a heated liquid supply hose and another fluid coupler for attaching a heated liquid return hose), a first electrical connector 116 for providing electrical power 120 from the first rail vehicle 106 to the fuel tender vehicle 110, a second electrical connector, comprising one or more MU receptacles 136, for coupling one or more MU cables 138 between the two vehicles for transfer of control signals 122 or otherwise, a Type F or other coupler 108, a release hose coupling 184 for attachment of an application and release hose, an actuating hose coupling 186 for attachment of an actuating hose, a main reservoir equalizing hose coupling 188 for attachment of a main reservoir equalizing hose, and a brake pipe hose coupling 190 for attachment of a brake pipe hose. (Functionally, the couplings 184, 186, 188, and 190 are brake pipe couplings.)

In an embodiment, the one or more MU receptacles 136 comprise two MU receptacles (e.g., two 27-pin MU receptacles). A first one of the MU receptacles/lines is for providing standard MU communications (e.g., AAR standard MU communications) as between any two coupled rail vehicles of the type to have MU cable busses (e.g., two adjacent locomotives). Examples of such communications include dynamic braking signals, headlight control signals, sanding control signals, and the like. A second of the MU receptacles/lines is for communicating control signals 122 or other control signals specific to the transfer of fuel and/or heated fluid or otherwise as set forth herein, between the first rail vehicle and the fuel tender vehicle only. Examples of such signals (e.g., each communicated over a separate conductor of the MU line, the MU lines each having plural discrete conductors) include an electrical ground/return on a first conductor, a first rail vehicle-to-fuel tender vehicle "handshake" on a second conductor (e.g., a +74V signal generated by the first rail vehicle indicates the first rail vehicle is present, and a lack of such a signal indicates the first rail vehicle is not present), a fuel tender vehicle-to-first rail vehicle return "handshake" on a third conductor (e,g., a +74V signal generated by the fuel tender vehicle indicates the fuel tender vehicle is present, and a lack of such a signal indicates the fuel tender vehicle is not present), and a fuel request signal on a fourth conductor, e.g., a control signal 122 generated by the controller 104 on the first rail vehicle to signal the fuel tender vehicle that the first rail vehicle is operating in a mode where a supply of fuel from the fuel tender vehicle is desired by the first rail vehicle; this signal may also be used to indicate the first rail vehicle is commencing transfer of the heated fluid to the fuel tender vehicle, The fuel request signal may be a +74V or other designated positive voltage signal, such that if the positive voltage signal is not present on the fourth conductor of the second MU line, the fuel tender vehicle will not provide fuel to the first rail vehicle. Further, the first rail vehicle (e.g., the controller 104) may be configured for monitoring a fifth conductor of the second MU receptacle, which the fuel tender vehicle is configured to set to a designated positive voltage level when the fuel tender vehicle is operating without faults. If the designated positive voltage level is present on the fifth conductor, the first rail vehicle is configured to enable all modes of operation of the first rail vehicle for using/handling the fuel provided by the fuel tender vehicle. If the designated positive voltage level is not present on the fifth conductor, the first rail vehicle is configured to disable one or more (or all) of the modes of operation of the rail vehicle involving using/handling fuel from the fuel tender vehicle.

Regarding coordinated braking of the first rail vehicle and fuel tender vehicle, both may be outfitted with air brakes (and the first rail vehicle and the fuel tender vehicle configured to be detachably fluidly connected by a brake pipe), electronically-controlled brakes (and the controller on the first rail vehicle is configured to generate the first control signals to include signals for controlling the electronically-controlled brakes on the fuel tender vehicle), combinations of the two, or the like.

One of more of the couplings (e.g., 112 and 118) may be break-away couplings with automatic shut-off valves for automatically sealing a line (e.g., fuel line, heated fuel line) if a hose, conduit, or the like breaks away.

In another embodiment, a system comprises an interface assembly on board a first rail vehicle and comprising: one or more mechanical couplers configured to mechanically couple the first rail vehicle to a separate, adjacent fuel tender vehicle; one or more fuel couplers configured to fluidly couple the first rail vehicle to the fuel tender vehicle for the transfer of compressed natural gas fuel from the fuel tender vehicle to the first rail vehicle; one or more electrical connectors configured to electrically connect the first rail vehicle to the fuel tender vehicle for the transfer of electrical power and first control signals; one or more fluid couplers configured to fluidly couple the first rail vehicle to the fuel tender vehicle for the transfer of a heated fluid between the first rail vehicle and the fuel tender vehicle for regasification of liquid natural gas stored on the fuel tender to the compressed natural gas; and one or more brake couplers configured to couple the first rail vehicle to the fuel tender vehicle for coordinated braking of the first rail vehicle and the fuel tender vehicle. The system further comprises a controller on hoard the first rail vehicle. The controller is configured to generate at least one of the first control signals or second control signals for controlling the transfer of the compressed natural gas from the fuel tender vehicle to the first rail vehicle and controlling the transfer of the heated fluid between the first rail vehicle and the fuel tender vehicle.

In another embodiment, a control method comprises, with one or more controllers on board a first rail vehicle, generating one or more fuel tender control signals for controlling a transfer of fuel from a fuel tender vehicle to the first rail vehicle, the fuel tender vehicle directly or indirectly mechanically coupled to the first rail vehicle, and a transfer of heated fluid between the first rail vehicle and the fuel tender vehicle for regasification of the fuel on board the fuel tender vehicle.

In another embodiment of the method, first and second discrete MU cables interconnect the first rail vehicle and the fuel tender vehicle, each MU cable having plural respective discrete conductors, and at least one of the one or more control signals is communicated over the second MU cable.

In another embodiment of the method, the method further comprises, with the one or more controllers, communicating consist control signals over the first MU cable, the consist control signals designated for use by all railway vehicles connected to a common MU cable bus of a consist in which the first railway vehicle is mechanically connected, and the fuel tender control signals designated only for use by the first railway vehicle and the fuel tender vehicle.

In another embodiment of the method, the method further comprises, responsive a positive voltage signal from the fuel tender vehicle being present on a designated conductor of the second MU cable, the one or more controllers enabling one or more modes of operation of the first railway vehicle in at least one of using or handling the fuel from the fuel tender vehicle, and responsive to the positive voltage signal from the fuel tender vehicle not being present on the designated conductor of the second MU cable, the one or more controllers disabling the one or more modes of operation of the first railway vehicle in said at least one of using or handling the fuel from the fuel tender vehicle.

In another embodiment of the method, the method further comprises, responsive to receiving a positive voltage signal from the fuel tender vehicle, the one or more controllers enabling one or more modes of operation of the first railway vehicle in at least one of using or handling the fuel from the fuel tender vehicle, and responsive to not receiving the positive voltage signal from the fuel tender vehicle, the one or more controllers disabling the one or more modes of operation of the first railway vehicle in said at least one of using or handling the fuel from the fuel tender vehicle.

In this written description, references to "one embodiment" or "an embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods.

What is claimed is:

1. A system comprising:
    an interface assembly on board a first rail vehicle and comprising:
        one or more mechanical couplers configured to mechanically couple the first rail vehicle to a separate, adjacent fuel tender vehicle;
        one or more fuel couplers configured to fluidly couple the first rail vehicle to the fuel tender vehicle for the transfer of fuel from the fuel tender vehicle to the first rail vehicle; and
        at least one of: one or more electrical connectors configured to electrically connect the first rail vehicle to the fuel tender vehicle for the transfer of at least one of electrical power or one or more first control signals; or one or more fluid couplers configured to fluidly couple the first rail vehicle to the fuel tender vehicle for the transfer of a heated fluid between the first rail vehicle and the fuel tender vehicle for regasification of fuel on the fuel tender vehicle; and
    a controller on board the first rail vehicle, wherein the controller is configured to generate at least one of the first control signals or second control signals for at least one of controlling the transfer of the fuel from the fuel tender vehicle to the first rail vehicle, controlling the transfer of the heated fluid between the first rail vehicle and the fuel tender vehicle, or controlling coordinated braking of the first rail vehicle and the fuel tender vehicle.

2. The system of claim 1, wherein:
    the interface assembly comprises both the one or more electrical connectors and the one or more fluid couplers; and
    the controller is configured to generate the at least one of the first control signals or the second control signals both for controlling the transfer of the fuel from the fuel tender vehicle to the first rail vehicle and controlling the transfer of the heated fluid from the first rail vehicle to the fuel tender vehicle for the regasification of the fuel on the fuel tender vehicle.

3. The system of claim 2, wherein:
    the controller is configured to generate the at least one of the first control signals or the second control signals for controlling the transfer of the heated fluid from the first rail vehicle to the fuel tender vehicle for the regasification of the fuel on the fuel tender vehicle from liquid natural gas to compressed natural gas; and
    the one or more fuel couplers are configured for the transfer of the compressed natural gas from the fuel tender vehicle to the first rail vehicle.

4. The system of claim 3, further comprising:
    a primary engine on board the first rail vehicle and configured for generating motive power to move the first rail vehicle and the fuel tender vehicle when mechanically coupled to the first rail vehicle by way of one or more of the one or more mechanical couplers, and wherein the primary engine is configured to operate, in at least one mode of operation, using a first fuel as an at least partial energy source, and to operate, in at least one other mode of operation, using the compressed natural gas as an at least partial energy source.

5. The system of claim 2, wherein at least one of the one or more electrical connectors is a locomotive multiple unit (MU) connector for electrically connecting an MU cable between the first rail vehicle and the fuel tender vehicle.

6. The system of claim 5, further comprising a router transceiver unit on board the first rail vehicle configured to communicate high bandwidth network data over the MU cable between the first rail vehicle and the fuel tender vehicle, wherein the controller is connected to the router transceiver unit for communicating one or more of the at least one of the first control signals or the second control signals as the network data over the MU cable between the first rail vehicle and the fuel tender vehicle.

7. The system of claim 2, wherein the controller is configured to generate the one or more first control signals for controlling the transfer of the heated fluid from the first rail vehicle to the fuel tender vehicle, the one or more first control signals comprising an initiation signal indicating that the first rail vehicle is ready to provide the heated fluid to the fuel tender vehicle, and wherein the controller is configured to initiate providing of the heated fluid to the fuel tender vehicle responsive to receiving an acknowledgement signal from the fuel tender vehicle, in response to the initiation signal, indicating that the fuel tender vehicle is ready to receive the heated fluid.

8. The system of claim 2, wherein the controller is configured to generate the second control signals for controlling a pump on board the first rail vehicle to pump the heated fluid from the first rail vehicle to the fuel tender vehicle over the one or more fluid couplers, the second control signals comprising at least a first pump signal for controlling the pump to provide a first level of flow of the heated fluid and a second pump signal for controlling the pump to provide a higher, second level of flow of the heated fluid.

9. The system of claim 2, wherein the one or more fluid couplers comprise a first fluid coupler for transfer of the heated fluid from the first rail vehicle to the fuel tender vehicle and a second fluid coupler for the first rail vehicle to receive the heated fluid back from the fuel tender vehicle.

10. The system of claim 2, further comprising:
 a pump on board the first rail vehicle and in fluid communication with the one or more fluid couplers;
 a tank on board the first rail vehicle and in fluid communication with the pump, the tank configured to store a fluid; and
 a heating device on board the first rail vehicle and in fluid communication with at least one of the pump, the tank, or the one or more fluid couplers, the heating device configured to heat the fluid to the heated fluid;
 wherein the controller is configured to generate the second control signals for controlling at least one of the pump or the heating device.

11. The system of claim 10, wherein the fluid comprises a 60% polypropylene glycol/40% water mixture.

12. The system of claim 1, wherein the first rail vehicle is a locomotive having a short hood on a first end of the locomotive and a long hood on a distal, second end of the locomotive, and the one or more fuel couplers are located at the second end of the locomotive.

13. The system of claim 12, wherein the one of more fuel couplers comprises one fuel coupler only, the locomotive having the one fuel coupler only and no other fuel couplers for transfer of fuel from the fuel tender vehicle to the locomotive.

14. The system of claim 1, wherein the interface assembly comprises the one or more electrical connectors configured to electrically connect the first rail vehicle to the fuel. tender vehicle, wherein at least one of the one or more electrical connectors is for the transfer of electrical power from the first rail vehicle to the fuel tender vehicle, and wherein the first rail vehicle is configured to output the electrical power at one or more of said at least one of the one or more electrical connectors that is for the transfer of electrical power, at a nominal 74V DC.

15. A system comprising:
 an interface assembly on board a first rail vehicle and comprising:
  one or more mechanical couplers configured to mechanically couple the first rail vehicle to a separate, adjacent fuel tender vehicle;
  one or more fuel couplers configured to fluidly couple the first rail vehicle to the fuel tender vehicle for the transfer of compressed natural gas fuel from the fuel tender vehicle to the first rail vehicle;
  one or more electrical connectors configured to electrically connect the first rail vehicle to the fuel tender vehicle for the transfer of electrical power and first control signals;
  one or more fluid couplers configured to fluidly couple the first rail vehicle to the fuel tender vehicle for the transfer of a heated fluid between the first rail vehicle and the fuel tender vehicle for regasification of liquid natural gas stored on the fuel tender to the compressed natural gas; and
  one or more brake couplers configured to couple the first rail vehicle to the fuel tender vehicle for coordinated braking of the first rail vehicle and the fuel tender vehicle; and
 a controller on board the first rail vehicle, wherein the controller is configured to generate at least one of the first control signals or second control signals for controlling the transfer of the compressed natural gas from the fuel tender vehicle to the first rail vehicle and controlling the transfer of the heated fluid between the first rail vehicle and the fuel tender vehicle.

16. A control method comprising:
 with one or more controllers on board a first rail vehicle, generating one or more fuel tender control signals for controlling a transfer of fuel from a fuel tender vehicle to the first rail vehicle, the fuel tender vehicle directly or indirectly mechanically coupled to the first rail vehicle, and a transfer of heated fluid between the first rail vehicle and the fuel tender vehicle for regasification of the fuel on board the fuel tender vehicle.

17. The method of claim 16, wherein first and second discrete MU cables interconnect the first rail vehicle and the fuel tender vehicle, each MU cable having plural respective discrete conductors, and at least one of the one or more control signals is communicated over the second MU cable.

18. The method of claim 17, further comprising, with the one or more controllers, communicating consist control signals over the first MU cable, the consist control signals designated for use by all railway vehicles connected to a common MU cable bus of a consist in which the first railway vehicle is mechanically connected, and the fuel tender control signals designated only for use by the first railway vehicle and the fuel tender vehicle.

19. The method of claim 17, further comprising, responsive a positive voltage signal from the fuel tender vehicle being present on a designated conductor of the second MU cable, the one or more controllers enabling one or more modes of operation of the first railway vehicle in at least one of using or handling the fuel from the fuel tender vehicle, and responsive to the positive voltage signal from the fuel tender vehicle not being present on the designated conductor of the second MU cable, the one or more controllers disabling the one or more modes of operation of the first railway vehicle in said at least one of using or handling the fuel from the fuel tender vehicle.

20. The method of claim 16, further comprising, responsive to receiving a positive voltage signal from the fuel tender vehicle, the one or more controllers enabling one or more modes of operation of the first railway vehicle in at least one of using or handling the fuel from the fuel tender vehicle, and responsive to not receiving the positive voltage signal from the fuel tender vehicle, the one or more controllers disabling the one or more modes of operation of the first railway vehicle in said at least one of using or handling the fuel from the fuel tender vehicle.

* * * * *